Dec. 29, 1959
H. T. HALL
2,918,699
HIGH PRESSURE PRESS
Filed April 28, 1958
3 Sheets-Sheet 1
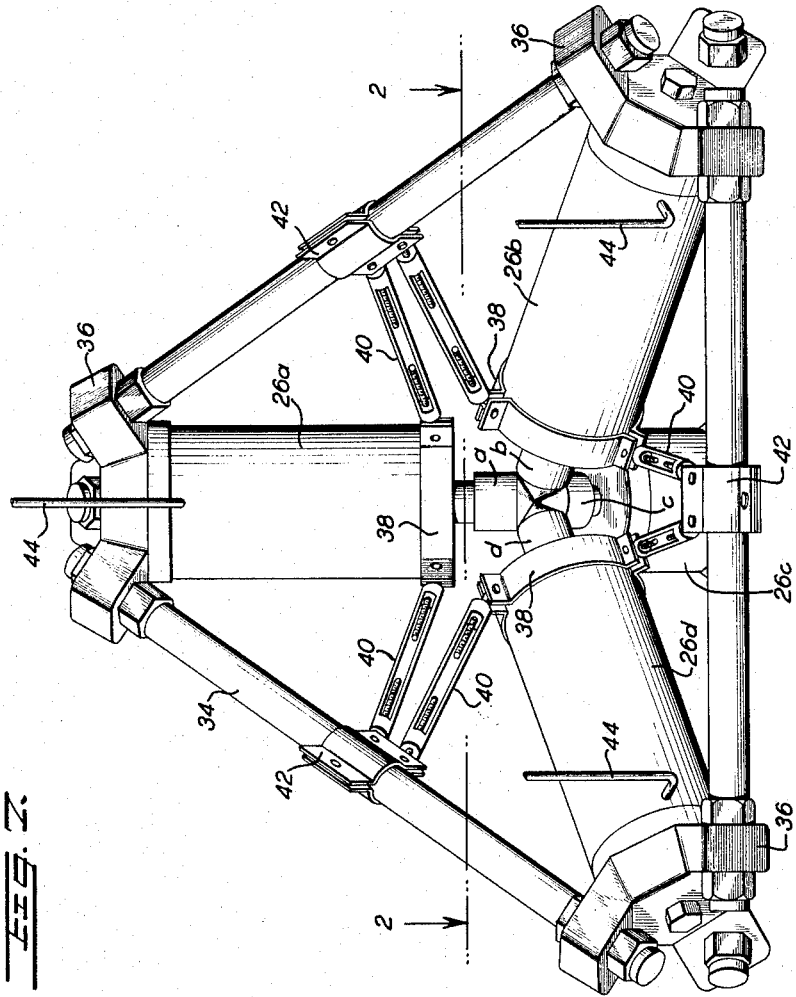
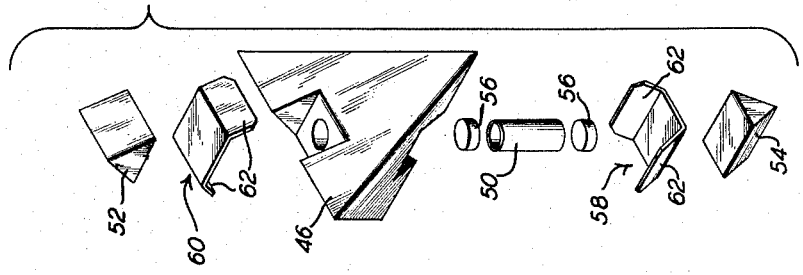
INVENTOR.
HOWARD T. HALL
BY
ATTORNEYS

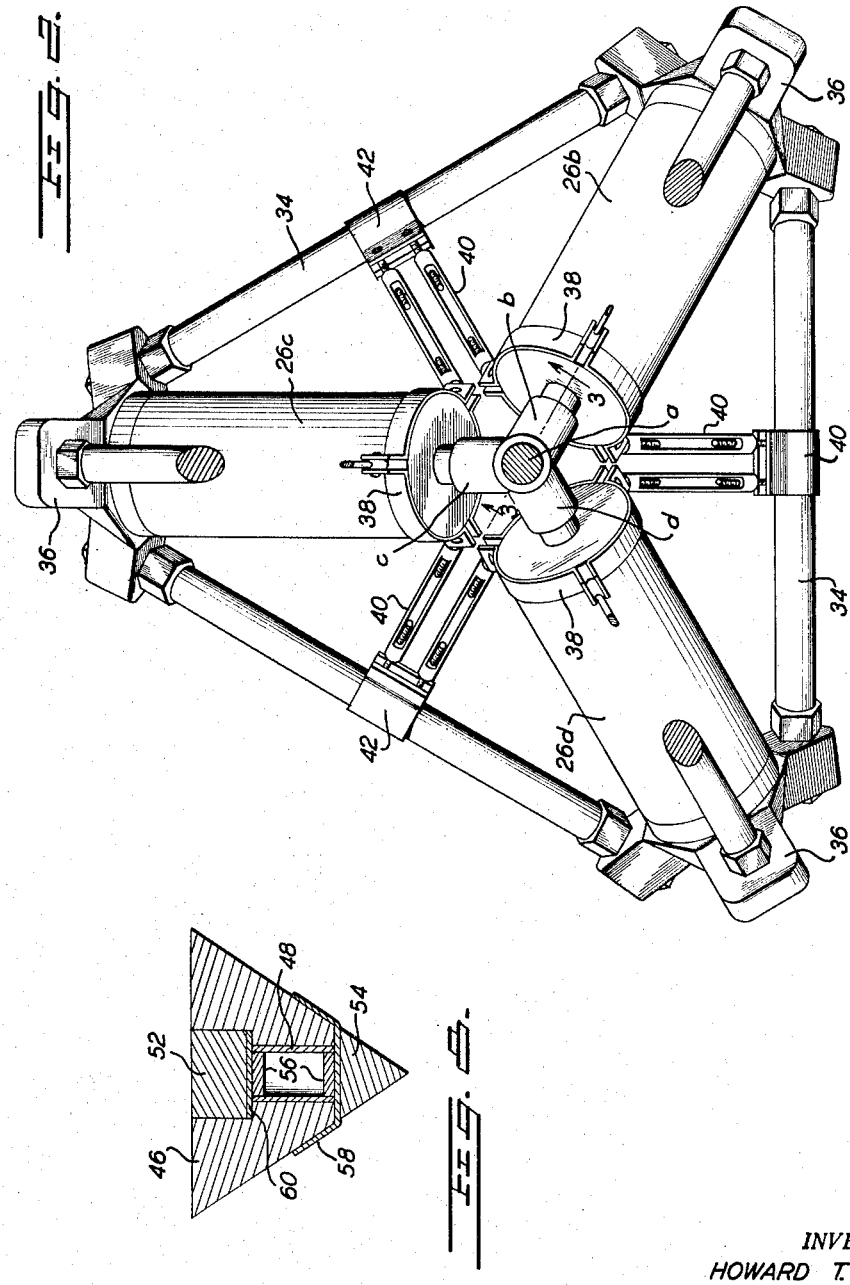

Dec. 29, 1959  H. T. HALL  2,918,699
HIGH PRESSURE PRESS
Filed April 28, 1958  3 Sheets-Sheet 3
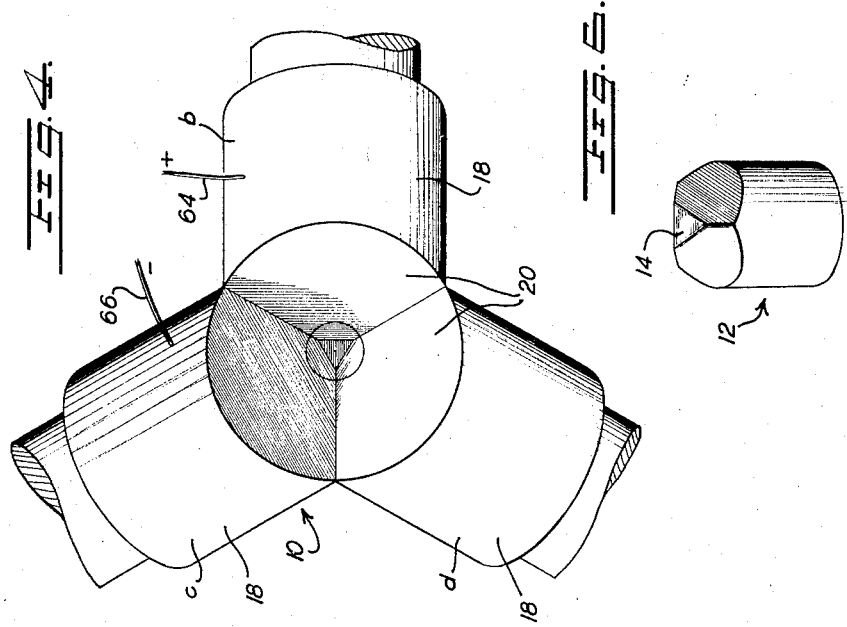
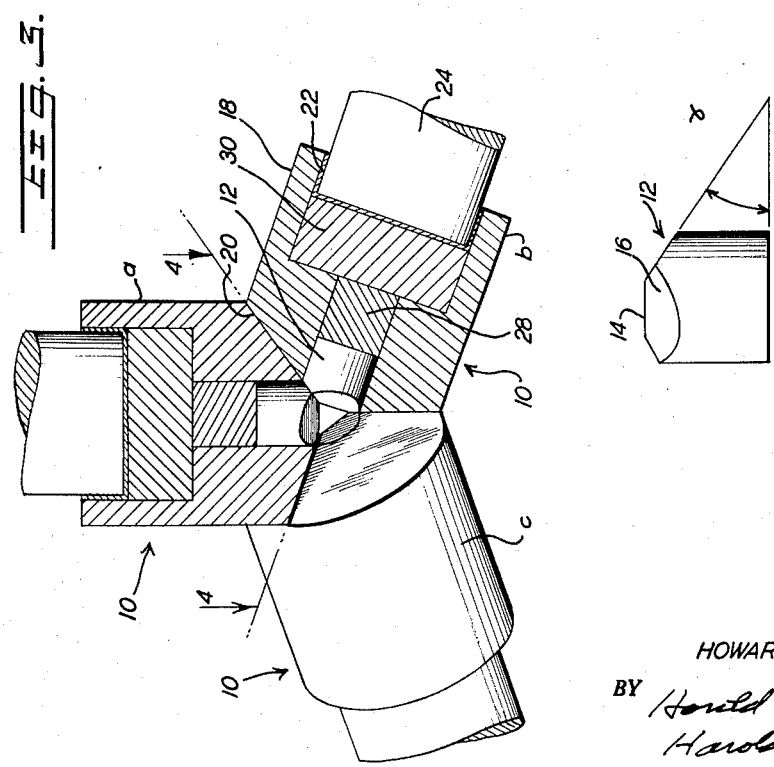
INVENTOR.
HOWARD T. HALL
BY Harold T. Stowell
Harold L. Stowell
ATTORNEYS

United States Patent Office 2,918,699
Patented Dec. 29, 1959

2,918,699

HIGH PRESSURE PRESS

Howard T. Hall, Provo, Utah, assignor to Research Corporation, New York, N.Y., a corporation of New York Application April 28, 1958, Serial No. 731,543

6 Claims. (Cl. 18—16)

This invention relates to new and improved presses and, more particularly, to presses wherein materials within the press may be subjected to extremely high pressures and, where desired, simultaneously heated to relatively high temperatures.

In general, the maximum pressure that can be generated in a press depends to a large extent upon the strength of the press materials and construction of the press itself. At the present time cemented tungsten carbides have the highest compressive strength of any readily available materials, the strength being in the order of 800,000 pounds per square inch. The use of cemented tungsten carbides in known high pressure presses permits operation of the devices in the neighborhood of about 50,000 atmospheres. The strength of cemented tungsten carbides in tension is known to be much less than in compression; thus, in order to obtain even pressures of about 50,000 atmospheres in the prior art presses, it was necessary to provide lateral support to the tungsten carbide press elements.

The difficulty in providing lateral support for the moving elements of piston and cylinder type presses coupled with the difficulty in providing adequate high pressure seals in prior art structures has materially limited the actual pressure obtainable even when materials having high compressive strength are employed.

It is a principal object of this invention to provide a unique press wherein the lateral support for the material subjected to pressure is provided by rectilinearly moving anvil devices.

A further object is to provide such a device which may be employed with solid pressure transmitting media and wherein such solid pressure transmitting media also serves as a thermal and electrical insulation and provides the necessary compressible gasket for the device.

A further object is to provide such a device that is relatively simple in form and dependable in use wherein materials, liquid, solid, granular or the like in nature, may be subjected to controlled high pressures and, when desired, simultaneously heated to relatively high temperatures whereby high pressures, or high pressure and temperature, reactions may be carried out or the effect of high pressure or high pressures and high temperatures on materials may be conveniently tested.

These and other objects and advantages are provided in a press generally comprising four anvil devices, each having similar equilateral triangular faces, means mounting each of the anvil devices for rectilinear motion along axes normal to the triangular faces of the anvil members and converging to a common intersection at equal solid angles whereby the four anvil faecs define a regular tetrahedron.

The invention will be more fully described with reference to the illustrative embodiments shown in the drawings, wherein:

Fig. 1 is a perspective view of a press embodying the principles of the invention;

Fig. 2 is a section substantially on line 2—2 of Fig. 1;

Fig. 3 is an enlarged fragmentary view in partial section of the anvil devices of the invention on line 3—3 of Fig. 2;

Fig. 4 is a section substantially on line 4—4 of Fig. 3;

Fig. 5 is an enlarged elevational view of one of the anvil members of the press;

Fig. 6 is a perspective view of the anvil device shown in Fig. 5;

Fig. 7 is an exploded view of a new solid pressure transmitting sample holder for the press shown in Figs. 1 through 6; and Fig. 8 is a sectional view through an assembled sample holder shown in Fig. 7.

Referring to the drawings and, in particular, Figs. 1 through 6, the press of the invention includes four anvil devices which, while identical in construction and generally designated with the reference numeral 10, are also identified by the letter designations $a$, $b$, $c$ and $d$ in Figs. 1 through 4 so that the orientation of the anvils with respect to one another may be more readily visualized.

Each of the anvil devices 10 comprises an anvil member 12. Each anvil member 12 is provided with an equilateral triangular face 14 in the extended end thereof with the side walls of the members 12 sloping away from the equilateral triangular face 14 along each of the edges thereof as is more clearly shown in Figs. 5 and 6. The slope angle $\alpha$ of the sloping walls, generally designated 16, is about 35.3° in the illustrated form of the invention.

On presses designed for operation at pressures not substantially greater than 35,000 atmospheres the anvil members 12 may be constructed of hardened steel, such as Nos. 4140 or 4340 or similar steels. Where substantially higher pressures are to be developed in the press, cemented tungsten carbide is preferably employed for the anvil members 12. It is also contemplated that other materials having suitably high compressive strength may be used, such as, for example, cemented cubic boron nitride.

In the form of the invention shown in the drawings, each of the anvil members 12 is supported in a binding ring 18, the binding ring being provided with a bore for snugly receiving the cylindrical body portion of the anvil members 12. Each of the binding rings 18 is provided with sloping faces generally designated 20, the slope of which is continuous with the slope of the faces 16 of the members 12.

The binding rings 18 are also provided with a further bore 22 at the end remote from the end receiving the anvil members 12. Each bore 22 is adapted to receive the extended end of a rectilinearly movable member 24 which, as shown in the drawings, comprises a piston rod from one of four hydraulic rams generally designated 26$a$, 26$b$, 26$c$ and 26$d$.

The binding rings 18 may be constructed of hardened steel, such as steel Nos. 4140, 4340 or the like. To reduce the shear forces when operating at substantial pressures with cemented tungsten carbide anvil members 12, it has been found useful to employ a cemented carbide insert 28 at the lower end of each of the bores in the binding rings 18 upon which the lower cylindrical face of each anvil member 12 rests.

The other end of the cemented carbide insert 28 bears against a further hardened tool steel insert 30 which provides a pressure transmitting member between the anvil member 12 and the face of the piston rods 24 of the hydraulic rams 26.

Each of the four hydraulic rams 26$a$, $b$, $c$ and $d$ is rigidly interconnected by stay bolts 34 which are bolted to plates 36 at the rearward end of each of the hydraulic rams 26. The spatial arrangement of the four hydraulic rams is such that the rectilinear movement of each of the piston rods 24 thereof are along lines normal to the triangular faces 14 of their respective anvil devices so that the triangular faces intersect at equal solid angles to define a regular tetrahedral space defined by the four triangular faces 14 of the four anvil devices 10a, b, c and d.

In order to provide support for each of the four hydraulic rams 26 at the head ends of the cylinders, each of the cylinders is provided with a ring member 38. Each ring member is interconnected by screw-type connectors generally designated 40 to brackets 42 secured to each of the stay bolts 34. As more clearly shown in Figs. 1 and 2 of the drawings, each ring member 38 of each piston is connected to three of the stay bolts 34 at points corresponding to the apices of an equilateral triangle described on the heads of the hydraulic rams. This arrangement of base elements 36, stay bolts 34 and screw connectors rigidly intermount each of the hydraulic rams so that the anvil devices 10a, b, c and d reciprocate along axes normal to the triangular faces 14 of the anvil members 12.

To complete the press assembly, each of the hydraulic rams 26a, b, c and d is connected to a source of pressure fluid through conduits 44. The source of pressure fluid may be from any conventional pump arrangement for directing a hydraulic fluid under controlled pressure to the several hydraulic rams.

In operation of the press hereinabove described, the material to be placed under pressure is positioned in a pressure transmitting and sealing carrier substances of larger dimensions than the regular tetrahedron defined by the four triangular faces of the anvil members when the sloping faces of the members and the support rings 18 are in substantial abutting arrangement as shown in Figs. 3 and 4 of the illustrative embodiments of the invention. Preferably the pressure transmitting substance is a fine grained compact solid material having good thermal and electrical insulating properties. A number of compact powders and fibers meet these requirements and an excellent readily machinable material which has been successfully employed is pyrophyllite, a naturally occurring hydrous aluminum silicate often called Tennessee Grade A Lava.

Pyrophyllite melts to a glassy substance at temperatures about 1500° C. at pressures of a few thousand atmospheres. Its melting point is increased considerably at very high pressures. When it is melted at high pressures molecular holes are squeezed out and the material is very viscous and does not flow readily. At very high pressures the upward limit of temperature usefulness for pyrophyllite as a pressure transmitting medium has not been established. It has been found, however, when the material is confined, to be a useful holder for materials to be placed under pressure at temperatures to 10,000° C. and at pressures of about 15,000 atmospheres. Pyrophyllite material holders have been successfully employed in the apparatus of the invention at pressures of greater than 100,000 atmospheres at temperatures of 3000° C.

Referring to Figs. 7 and 8, a regular pyrophyllite tetrahedron 46 is constructed with edges about 25% larger than the corresponding edges of the triangles 14 of the anvil members 12. The pyrophyllite serves as a pressure transmitting medium and as thermal and electrical insulation, and provides the necessary compressible gasket for the system. The pyrophyllite tetrahedron is bored as at 48 to provide an opening for a material container 50 running diagonally through the pyrophyllite tetrahedron from opposite edges as more clearly shown in Fig. 7.

The material container is preferably tubular in form and may be constructed of metal or graphite where the material is to be heated while under pressure. Where the material is not to be heated, the entire space formed by the bore passing diagonally from edge to edge of the pyrophyllite tetrahedron may be filled with material to be compressed.

Where the material to be placed under pressure is also to be heated, the pyrophyllite tetrahedral sample holder is cut to remove from the tetrahedron prism shaped portions 52 and 54, the bases of which are in abutting relationship to the material container 50. Electrical connections are made to the container 50 through metal conductors 58 and 60 shaped as shown in Figs. 7 and 8. Where the container 50 and its end closures 56 are metallic, the electrical conductors 58 and 60 may be spot welded to the ends of the container.

The tabs 62 of each conductor 58 and 60 make electrical contact with the faces of a pair of the anvil devices 10a, b, c or d which bring in the electrical heating current through, for example, conductors 64 and 66 attached to anvil devices b and c in Fig. 4 of the drawings. The heating of the material is effected by the electrical resistance of the container 50 on the passage of current therethrough. The tetrahedral pyrophyllite material holder provides electrical insulation between the opposed faces of the two anvil devices 10b and 10c during actual operation of the press, while electrical insulation between the anvil supporting structures may be provided by insulators 65 shown in Fig. 3 which may comprise thin fiberboard.

Before the tetrahedral holder is placed in the press prisms 52 and 54 are cemented into their respective openings.

In addition, when desired, a thermocouple may be inserted in the pyrophyllite tetrahedron for temperature measurements with fine wires from the thermocouple passing through fine bores provided for that purpose in the material holder. Further, when desired, pressure indictators may also be provided for the device as is known in the art.

In operation, the pyrophyllite tetrahedron is centered on the triangular faces 12 of the anvil devices, after the anvil faces of the devices have been painted with rouge to increase friction. The anvils are then simultaneously forced together and since the triangular faces of the pyrophyllite tetrahedron are larger than the triangular faces of the anvil devices, some of the pyrophyllite is forced between the sloping sides of the anvils and a sealing gasket is automatically formed. Continued motion of the anvils compresses the gasket and tetrahedral holder, the pressure on the tetrahedral holder being transmitted to the material contained therein.

*Example*

In a representative press constructed in accordance with the drawings, the length of the edges of the four anvil faces was one-half inch and the effective area of the heads of the pistons of each of the hydraulic rams was fifty square inches. A tetrahedral pyrophyllite holder having an edge length of about ⅝ inch and carrying a graphite material container $5/64$ inch in diameter and $2/10$ inch in length filled with silver chloride was placed in the press, as described above, with a pressure sensitive wire passing through the silver chloride. When hydraulic pressure was exerted on the rams, pressures of the order of 100,000 atmospheres were registered in the container with ram loads of about 85 tons.

While only one form of drive means for the plural anvil members has been specifically shown in the drawings, it is apparent that other forms of drive means may be effectively employed without departing from the scope of the present invention. For example, screw means may replace the hydraulic rams 26a, b, c and d or combination screw means and hydraulic rams can be effectively employed.

It is further evident that various modifications may be made in other specific features of the press without

I claim:

1. A press comprising four anvil devices each having similar equilateral triangular faces, means mounting each of said anvil devices for rectilinear motion along axes normal to said triangular faces and converging to a common intersection at equal solid angles whereby said four triangular faces define a regular tetrahedron.

2. The invention defined in claim 1 wherein the mounting means for each of the anvil devices comprises a hydraulic ram.

3. The press defined in claim 1 including a pressure transmitting member comprising a regular pyrophyllite tetrahedron, the edges of which are larger than the corresponding edges of the triangular faces of said anvil members.

4. The invention defined in claim 3 including a container adapted to receive material to be pressed supported in said pyrophyllite tetrahedron.

5. A press comprising four anvil devices each having equilateral triangular faces, means supporting each of said anvil devices including means for urging said anvil devices along converging lines normal to the triangular faces of the respective anvil devices and positioned at equal solid angles from each other, whereby the triangular faces of the four anvil devices define a regular tetrahedron.

6. The invention defined in claim 5 wherein the means for urging the anvil members along lines normal to their triangular faces comprise hydraulic rams.

References Cited in the file of this patent

UNITED STATES PATENTS

| 762,054 | Hendricksen | June 7, 1904 |
| 1,454,478 | Lewis | May 8, 1923 |
| 2,857,824 | Fair | Oct. 28, 1928 |

FOREIGN PATENTS

| 289,891 | Germany | Feb. 4, 1915 |